Oct. 31, 1944.  F. GREENBERG  2,361,683
ADAPTER FOR DRILLS
Filed June 25, 1943
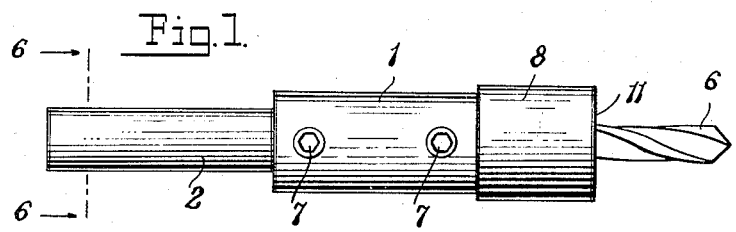
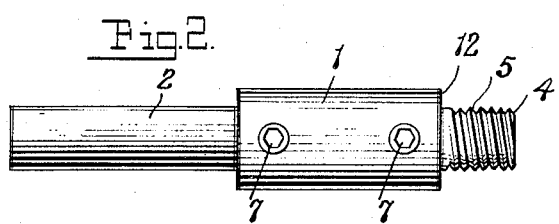
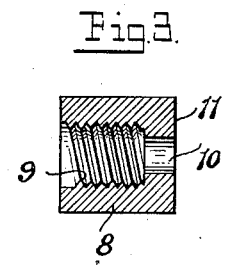
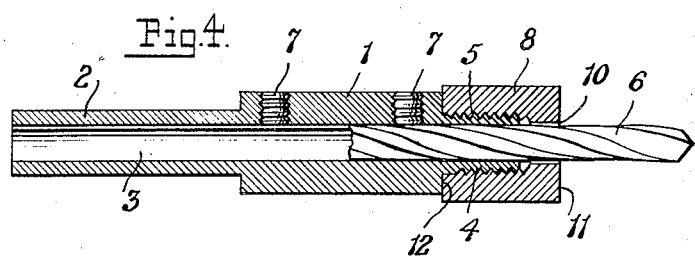
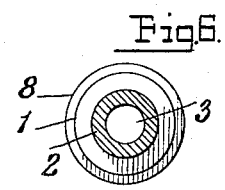
INVENTOR.
Frank Greenberg
BY
Harry Radzinsky
Attorney Patented Oct. 31, 1944

2,361,683

UNITED STATES PATENT OFFICE 2,361,683

ADAPTER FOR DRILLS

Frank Greenberg, New York, N. Y.

Application June 25, 1943, Serial No. 492,226

1 Claim. (Cl. 77—60)

This invention relates to holders or adapters for twist drills and similar tools, and has for its object the provision of a device of this character which will greatly prolong the life of the drills; which will permit the use of drills which have been broken off short, and which will possess numerous other advantages clearly apparent to those skilled in this art.

At the present time, it is common practice in many shops and factories to discard broken and bent drills with the result that in most large industries, such as in airplane manufacturing plants, the expense for drill replacement is exceedingly heavy. One of the primary objects therefore, of the present invention, is to provide a holder or adapter in which drills that have been broken off short, can be accommodated, and can be held and used in the conventional power-drill chuck so that discarding of such broken drills will become quite unnecessary.

Another object of the invention is to provide an adapter of this character in which either broken or unbroken drills may be held and used in the manner described, the adapter when used in connection with the drills, serving as a protector for the same and greatly increasing their useful life.

A still further object of the invention is to provide, in an adapter of the character described, means by which defacement or abrasion of the surface of the work adjacent to the drill hole is effectively prevented.

More particularly, the invention contemplates the provision of a sleeve-like member in which a drill or part of a drill is held, with the pointed end of the drill extending from the sleeve-like member for the required extent, and surrounded by a cap of non-defacing material. Set screws are provided for holding the drill from rotative movement in the sleeve and a shank portion is provided at one end of the sleeve for reception in the chuck of the conventional power drilling apparatus.

In the accompanying drawing, forming a part hereof, Fig. 1 is a side elevation of a drill holder or adapter constructed in accordance with the invention; Fig. 2 is a similar view with the non-defacing cap member removed; Fig. 3 is a sectional view through the cap member; Fig. 4 is a longitudinal sectional view through the entire adapter; Fig. 5 is a view of a modified construction, parts of the same being shown in section, and Fig. 6 is a sectional view on the line 6—6 of Fig. 1, looking in the direction of the arrows.

With reference to the structure shown in Figs. 1 to 4 inclusive and also in Fig. 6, the body portion of the adapter or holder is shown at 1, the same consisting of a sleeve or cylinder provided with an integrally formed shank portion 2 of a suitable diameter to enable it to be accommodated in the chuck of a conventional power drilling machine. At its opposite end, the body portion 1 is provided with an integrally formed extension or nipple 4, which is externally threaded as indicated at 5. Extending axially through the body portion 1, as well as through the shank 2 and nipple 4, is a continuous bore or passage 3 of a diameter to closely fit a twist drill 6 of a given size. Extending through the body portion 1 are one or more set screws 7 which engage against the drill 6 and hold it securely against rotative movement within the adapter.

When a twist drill of conventional construction is held in the chuck of a power drilling machine and relatively thin material, such as the so-called "skin" of an airplane, is drilled, the drill often penetrates the work so rapidly that the operator very often allows the rapidly rotating chuck to come into contact with the work, thus abrading or marring it adjacent to the drill hole. To prevent this, many operators resort to various makeshift expedients, such as wrapping tape around the drill to keep the chuck from contacting with the work. Such tape soon picks up metallic particles which abrade or scratch the work.

At 8 is shown means for preventing abrasion and defacement of the work, said means consisting of a cup-shaped cap member, internally threaded at 9, for reception upon the threaded extension or nipple 4 of the body portion 1. The cap member 8 is provided with a central hole 10 forming a continuation of the bore 3 through the adapter and permitting passage of the drill 6 through it, as clearly seen in Fig. 4. The cap member 8 is composed of suitable non-defacing and non-abrasive material, such as "Micarta" or the like, and it has a smooth end surface 11 directed toward the pointed end of the drill, and which, when brought into contact with the surface of the work through which the drill 6 has passed, will not mar or deface the same. At the same time, the face 11, located at a selected distance from the point or tip of the drill, may be used as a stop to limit penetration of the drill in cases where restricted penetration of the drill is desired.

From the foregoing, the operation of the improved adapter will be readily understood. A drill that has broken off short, such as shown at 6 in Fig. 4, yet is of sufficient length to penetrate the work, may be readily used in the adapter by inserting it in the bore 3 and tightening one or more of the set screws to hold it securely in place. Such length of the drill as is required to penetrate the work is extended beyond the end 11 of the protective cap 8, and thus the remainder of the drill is enclosed and protected by the adapter and cap 8. Should the protruding part of the drill break off, and a sufficient portion of the length of the drill remain intact, a new point can be ground on the drill and a portion extended out of the adapter for a sufficient distance to enable penetration of the work to be had. Since most work performed by a drill requires only a small part of the length of the drill, it will be clear that with an adapter of this character, the life of a drill will be immeasurably increased, since all of the drill, except the part required for drilling penetration, is enclosed in and protected by the adapter.

While the adapter is primarily intended for use in connection with broken drills, it is made of sufficient length, and particularly in connection with the smaller sized drills, to accommodate unbroken drills, thus enclosing and reinforcing the shank and major portion of the drill, allowing only the necessary cutting part to protrude for drilling purposes. Thus, since most of the drill is enclosed and protected, the possibility of bending or breakage of the drill, and particularly at the junction of the shank and spirals where many drills bend or break, is rendered very remote.

The cap 8 is fitted over the threaded extension or nipple 4 and is threaded thereon until it abuts against the shoulder 12. This cap can not only be used as a stop to limit penetration of the drill, but as heretofore explained, since it is provided with a non-defacing surface or end 11, it will prevent damage to the face of the work when the drill suddenly penetrates through it. It will also be noted that the cap 8 is of greater diameter than the body portion 1 of the adapter, so that it extends laterally to a greater extent than any other portion of the adapter and thus provides lateral protection for the adapter and work with which it may come into contact.

To facilitate insertion of a drill into the adapter, and particularly when a full length or unbroken drill is used, the bore 3 is extended completely through the adapter from one end of the same to the other end, as clearly seen in Fig. 4. This permits insertion of the drill from either end of the adapter.

In the embodiment of the invention shown in Fig. 5, an adapter is disclosed for the accommodation of a drill of relatively large diameter. In this embodiment, the bore 13 extends only part way through the adapter, the inner or closed end of the bore terminating at 14, since a short length of the drill is to be accommodated in this device. It will also be noted that in this construction the shank 2 of the adapter is of relatively small diameter as compared to the diameter of the bore 3 in which a drill of relatively large diameter is held. Through this arrangement, a large diameter drill can be accommodated in the small chuck of a light-weight low-power drilling machine. This is particularly advantageous when relatively large holes are to be drilled in easily-penetrable material not requiring a heavy, powerful drilling machine. With this arrangement, a large sized drill is used in a small drilling machine and the fatigue of constantly operating a heavy machine for long periods will be avoided.

While I have herein described the improved adapter or holder as intended for the reception of twist drills, it will be readily appreciated by those skilled in the art that the invention need not be limited to such use, since taps, reamers and other tools may be accommodated in the adapter with equal facility. Therefore, when herein referring to "drills" I wish to be understood as including taps, reamers and other similar tools capable of being used in the manner described.

What I claim is:

An adapter for either broken-off or full-length drills comprising, a sleeve having a shank for reception in the chuck of a drilling machine, said shank having an integrally formed threaded nipple at one end, the sleeve having a bore extending through it, said bore receiving a drill or broken-off part thereof with the pointed end of the drill protruding out of the end provided with the threaded nipple, at least one set screw extending through the sleeve, said set screw being located relatively close to the threaded nipple to engage a broken-off drill section located in the bore, a cup-shaped protective member of non-abrasive material internally threaded for reception on the threaded nipple, said cup-shaped member having an end wall provided with a hole only slightly larger than the diameter of the drill received in the bore and fully enclosing and covering the forward end of the nipple.

FRANK GREENBERG.